(12) United States Patent
Rozsa et al.

(10) Patent No.: US 10,613,414 B2
(45) Date of Patent: Apr. 7, 2020

(54) ACOUSTO-OPTIC DEFLECTOR WITH LAYERED STRUCTURE AND METHOD FOR DEFLECTING AN OPTICAL BEAM WITH SUCH DEFLECTOR

(71) Applicant: Femtonics Kft., Budapest (HU)

(72) Inventors: Balazs Rozsa, Budapest (HU); Gergely Katona, Budapest (HU); Mate Veress, Budapest (HU); Pal Maak, Budapest (HU); Gergely Szalay, Budapest (HU)

(73) Assignee: Femtonics Kft., Budapest (HU)

( * ) Notice: Subject to any disclaimer, the term of this patent is extended or adjusted under 35 U.S.C. 154(b) by 120 days.

(21) Appl. No.: 15/578,590

(22) PCT Filed: May 31, 2016

(86) PCT No.: PCT/HU2016/050020
§ 371 (c)(1),
(2) Date: Nov. 30, 2017

(87) PCT Pub. No.: WO2016/193770
PCT Pub. Date: Dec. 8, 2016

(65) Prior Publication Data
US 2018/0157147 A1    Jun. 7, 2018

(30) Foreign Application Priority Data
Jun. 1, 2015   (HU) .................................... 1500264

(51) Int. Cl.
*G02F 1/33*    (2006.01)
*G02F 1/31*    (2006.01)
*G02F 1/11*    (2006.01)
*G02B 26/10*   (2006.01)

(52) U.S. Cl.
CPC ............. *G02F 1/332* (2013.01); *G02B 26/10* (2013.01); *G02F 1/113* (2013.01); *G02F 1/31* (2013.01); *G02F 1/33* (2013.01); *G02F 2201/16* (2013.01)

(58) Field of Classification Search
CPC . G02F 1/332; G02F 1/113; G02F 1/31; G02B 26/10
See application file for complete search history.

(56) References Cited

U.S. PATENT DOCUMENTS

| 9,069,227 | B2 * | 6/2015 | Kirkby | G02B 21/0024 |
| 2017/0212406 | A1 * | 7/2017 | Rozsa | G02F 1/332 |
| 2017/0336697 | A1 * | 11/2017 | Peled | G02F 1/11 |
| 2019/0331981 | A1 * | 10/2019 | Ismail | G03F 7/7015 |

* cited by examiner

*Primary Examiner* — Jack Dinh
(74) *Attorney, Agent, or Firm* — Olson & Cepuritis, Ltd.

(57) ABSTRACT

An acousto-optic deflector with a layered structure (10) comprises at least two acousto-optic crystals (12), to each of which at least one electro-acoustic transducer (14) is connected, and the adjacent crystals (12) are separated by an acoustic isolator (16). A method for deflecting an optical beam using the acousto-optic deflector (10), comprises creating a first acoustic wave (15') in a first acousto-optic crystal (12') using a first electro-acoustic transducer (14') connected to the first acousto-optic crystal (12'), and creating a second acoustic wave (15") in a second acousto-optic crystal (12") using a second electro-acoustic transducer (14") connected to the second acousto-optic crystal (12") and arranged between the first acousto-optic crystal (12') and the second acousto-optic crystal (12").

14 Claims, 4 Drawing Sheets

Figure 2A:
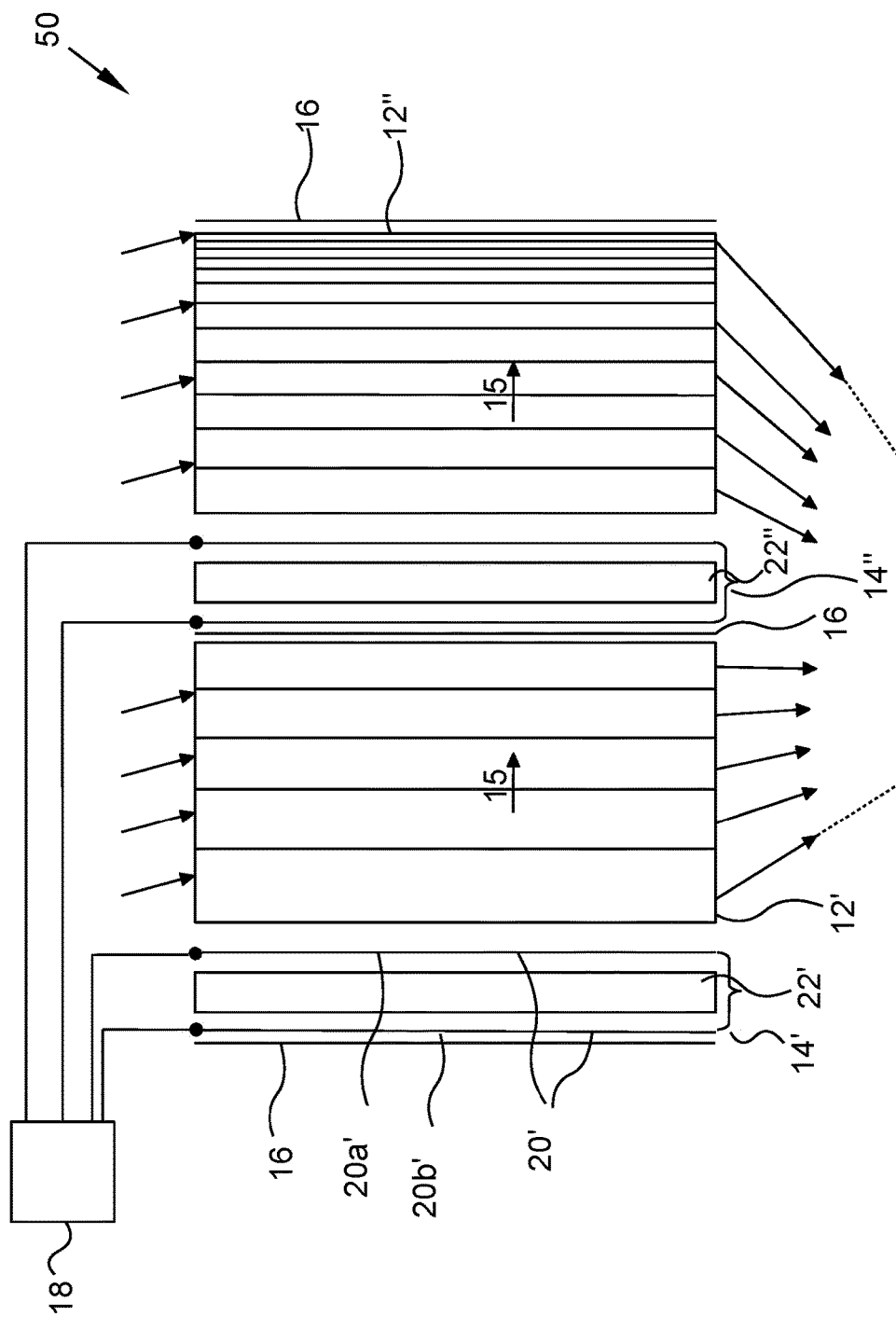

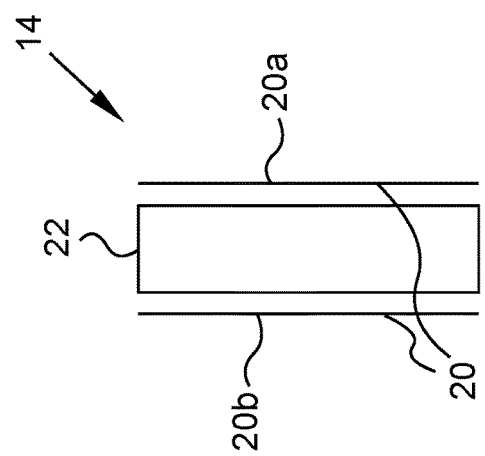
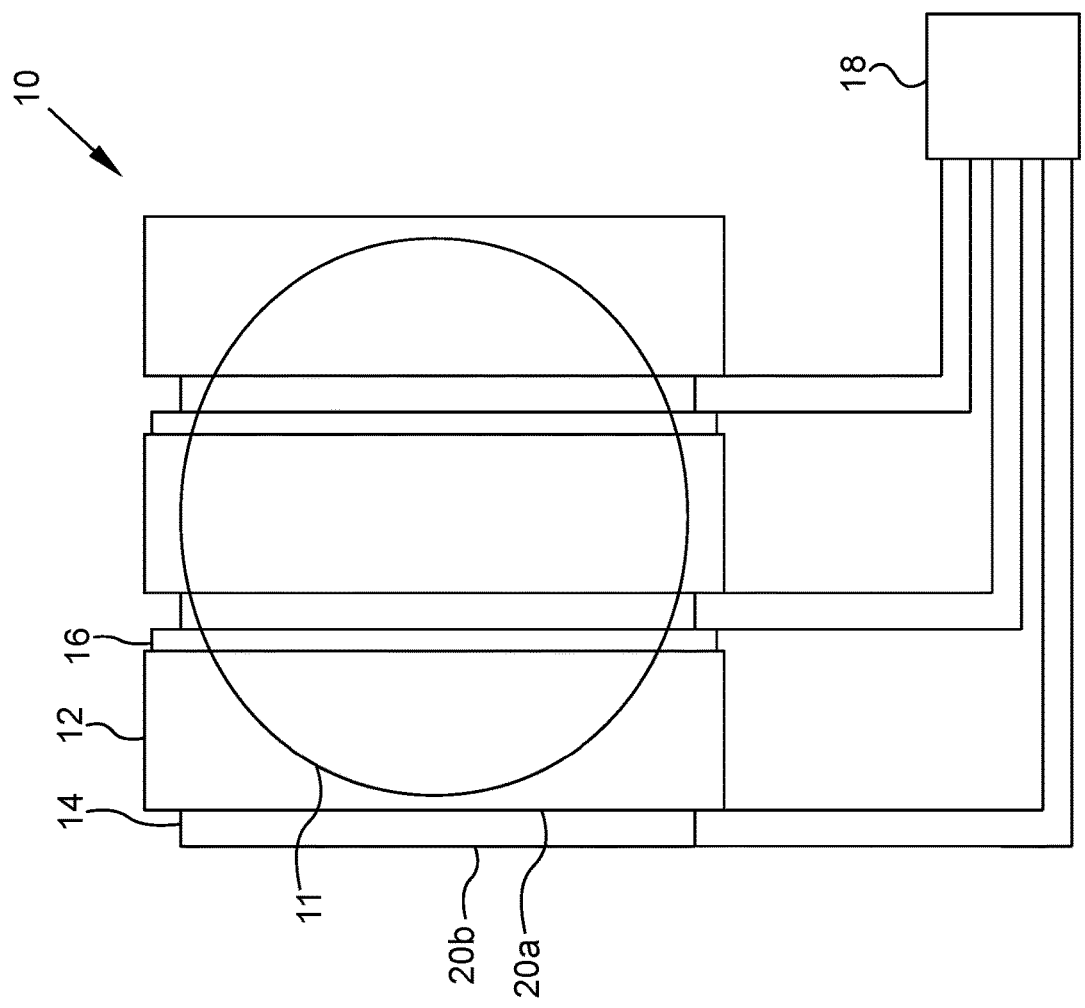

ACOUSTO-OPTIC DEFLECTOR WITH LAYERED STRUCTURE AND METHOD FOR DEFLECTING AN OPTICAL BEAM WITH SUCH DEFLECTOR

CROSS-REFERENCE TO RELATED APPLICATIONS

This application is a U.S. National Stage of PCT/HU2016/050020, filed May 31, 2016, which claims priority of Hungarian Patent Application No. P1500264, filed Jun. 1, 2015, each of which is incorporated herein by reference.

The subject of the invention relates to an acousto-optic deflector with a layered structure.

The subject of the invention also relates to a method for deflecting an optical beam using an acousto-optic deflector.

Recently numerous optical methods have been developed for the three-dimensional examination of neural activity, however, only a few of these comply with the requirements of scanning speed, and only some of them are suitable for examining deeper regions of brain tissue (Katona, G. et al. Roller Coaster Scanning reveals spontaneous triggering of dendritic spikes in CA1 interneurons. Proceedings of the National Academy of Sciences of the United States of America. 108, 2148-2153 (2011), Nikolenko, V. et al. SLM Microscopy: Scanless Two-Photon Imaging and Photostimulation with Spatial Light Modulators. Frontiers in neural circuits. 2, 5 (2008), Holekamp, T. F., Turaga, D. & Holy, T. E. Fast three-dimensional fluorescence imaging of activity in neural populations by objective-coupled planar illumination microscopy. Neuron. 57, 661-672 (2008), Botcherby, E. J. et al. Aberration-free three-dimensional multiphoton imaging of neuronal activity at kHz rates. Proceedings of the National Academy of Sciences of the United States of America. 109, 2919-2924 (2012)).

Among the currently existing solutions, acousto-optic technology ensures the fastest scanning speed by making it possible to pre-select the points of interest in the examined volume, therefore, it is not necessary to measure all the elements in the given volume.

Two-photon microscopy makes it possible to examine deeper regions of tissue. The acousto-optic deflectors used for high volumetric resolution two-photon microscopy must have a large aperture (15-17 mm), as the resolution of the optical grid generated by the acoustic wave passing through the deflector is directly proportional to the size of the aperture of the deflector.

It is especially important to take into consideration any movement of the sample during measurement during "in vivo" measurements and correct this movement. Recordings must also be made of the environments of the points to be measured for the subsequent correction of the measurements, this, however, will significantly reduce temporal resolution. The switching time of the acousto-optic deflector sets a limit to increases in scanning speed, in other words the propagation time of the acoustic wave passing past the deflector aperture. It is only possible to reduce the passage time of the acoustic wave by reducing the length of the path traveled by the acoustic wave, in other words by reducing the size of the deflector aperture, which, however, would lead to a deterioration in volumetric resolution.

The objective of the invention is to provide an acousto-optic deflector and method for deflecting optical beams that is free of the disadvantages according to the state of the art. Deflection also means deflection of certain parts of the beam, therefore, the focussing of the beam, or the creation of a dispersing beam which may be focussed with a lens or lens system located after the deflector.

The invention is based on the recognition that the switching time of the acousto-optic deflector may be reduced by setting up several acousto-optic crystals, and electro-acoustic transducers connected to the individual acousto-optic crystals. We also recognised that through the synchronised control of the transducers connected to the individual acousto-optic crystals, the optical beam passing through the acousto-optic deflector may be focussed at one point or even at several points.

The task is solved with an acousto-optic deflector with a layered structure in accordance with the invention, the essence of which is that it contains at least two acousto-optic crystals, with at least one electro-acoustic transducer connected to each of these crystals, and the adjacent crystals are separated by an acoustic isolator.

The task is solved in accordance with the invention with a method aimed at deflecting an optical beam using an acousto-optic deflector, the essence of which is that the acousto-optic deflector contains at least two crystals, among which an acoustic wave is created in a first crystal using a first electro-acoustic transducer connected to the first crystal, and a second acoustic wave is created in a second crystal using a second electro-acoustic transducer connected to the second crystal and arranged between the first crystal and the second crystal.

Further advantageous embodiments of the invention are defined in the attached dependent claims.

Further details of the invention will be apparent from the accompanying figures and exemplary embodiments.

Figure 2B:
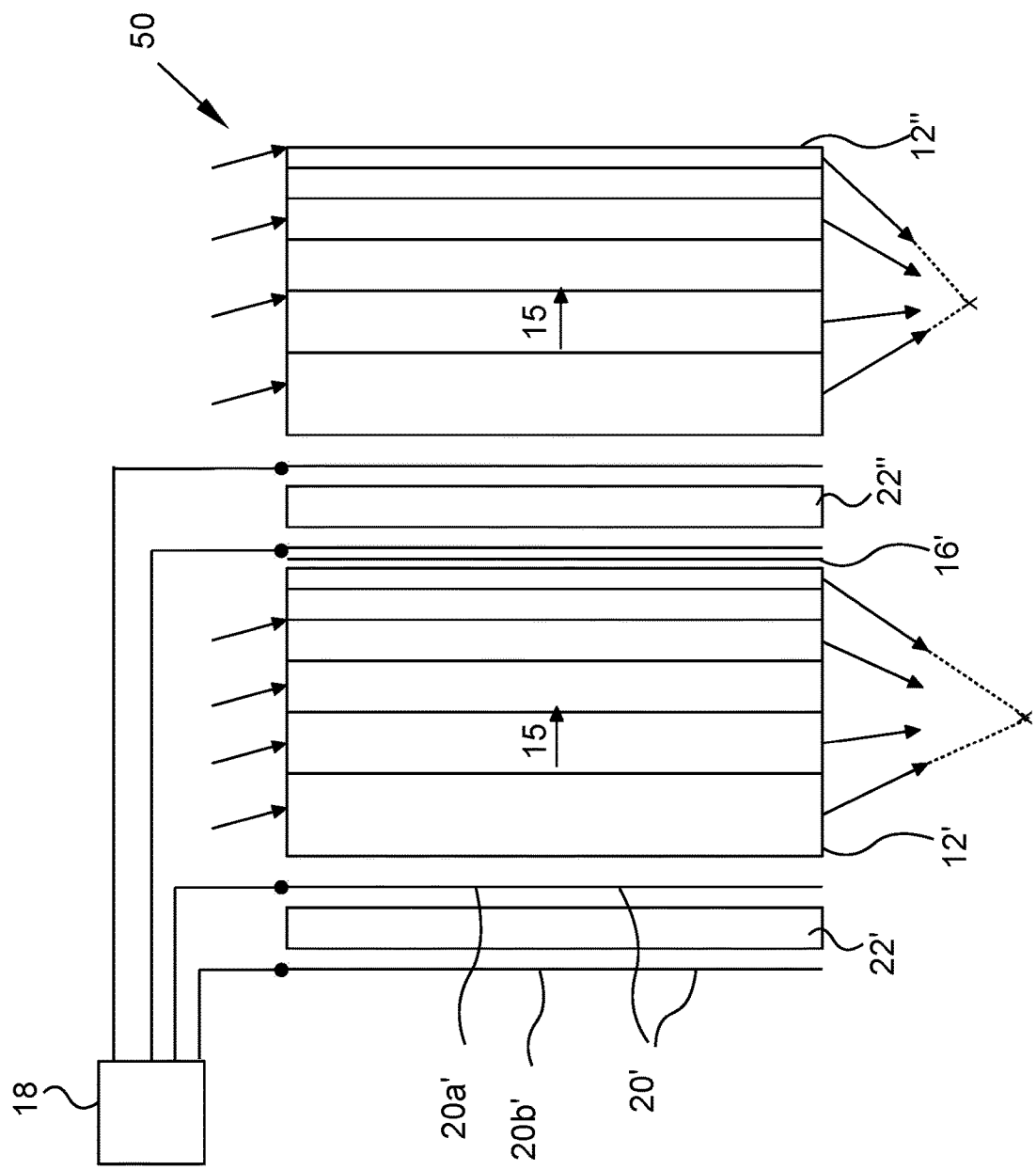
Figure 3B:
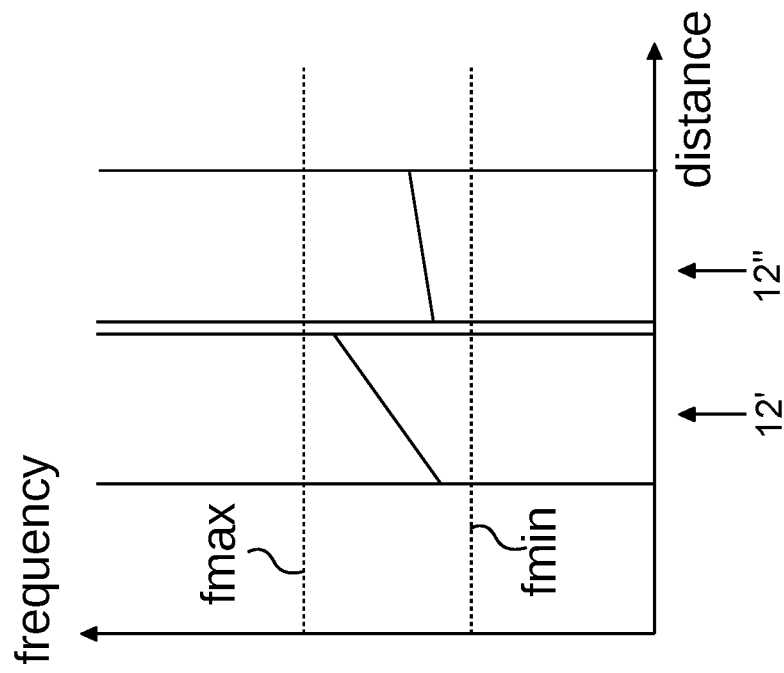
Figure 3A:
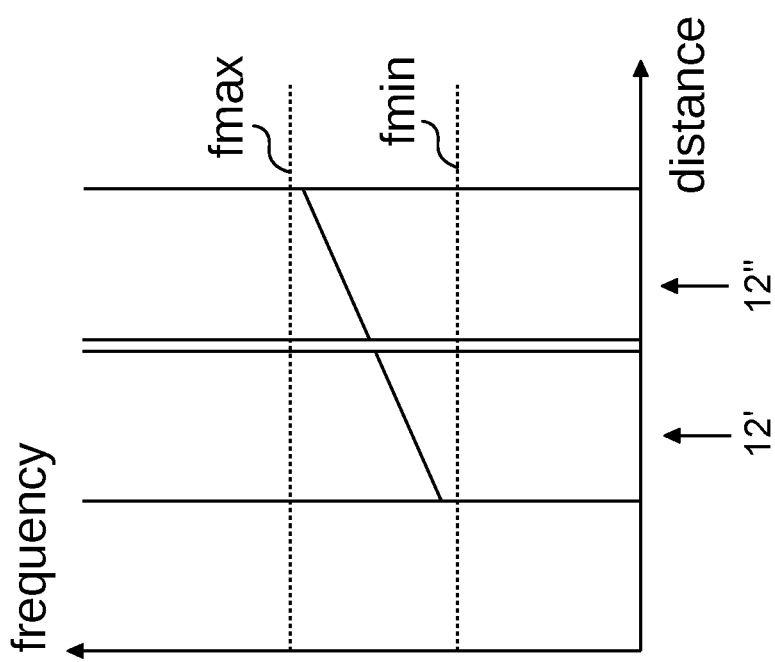

FIG. 1a illustrates a schematic picture of an exemplary embodiment of the acousto-optic deflector with a layered structure according to the invention, FIG. 1b illustrates a schematic cross-section picture of an exemplary embodiment of an exemplary electro-acoustic deflector, a FIG. 2a illustrates a schematic cross-section picture of an embodiment of the acousto-optic deflector with a layered structure according to the invention while in operation, in which the focussing of an optical beam into one point has been illustrated, FIG. 2b illustrates a schematic cross-section picture of an embodiment of the acousto-optic deflector with a layered structure according to the invention during operation, in which the focussing of an optical beam to several points has been illustrated, FIG. 3a illustrates the distance dependency of the frequency of an acoustic wave created in the acousto-optic deflector with a layered structure according to FIG. 2a, and FIG. 3b illustrates the distance dependency of the frequency of an acoustic wave created in the acousto-optic deflector with a layered structure according to FIG. 2b.

The schematic picture of an exemplary embodiment of the acousto-optic deflector with a layered structure 10 according to the invention may be seen in FIG. 1a. The acousto-optic deflector with a layered structure 10 has an aperture 11, which for purposes of illustration has been indicated with a circle. The acousto-optic deflector with a layered structure 10 preferably contains at least two, preferably several, even more preferably 3-6 crystals 12, which divide the aperture 11 into bands with thickness d. The thicknesses d of the crystals 12 are either the same (as seen in FIG. 1) or different. The crystals 12 may be preferably made from a mono-crystal (such as TeO2, LiNbO3) in which the refractive index has changed as a result of the effect of mechanical stress. At least one electro-acoustic transducer 14 suitable for generating acoustic waves is connected to each of the crystals 12, and the adjacent acousto-optic crystals 12 are separated from each other with an acoustic isolator 16. In a given case the resonator of the transducer 14 (see below) may be established by gluing a piezoelectric crystal to the side of the crystal 12, then by gradually grinding the piezoelectric crystal down until the desired thickness is achieved. One or more electric signal generators 18 are also connected to the transducers 14 of the acousto-optic deflector with a layered structure 10 according to the invention.

Preferably each transducer 14 is connected to a crystal 12 in such a way that it is able to generate acoustic waves in it, while being isolated from another, adjacent crystal 12, in a given case, with the acoustic isolator 16, which prevents the transducer generating an acoustic wave in that one also. In the case of the embodiment visible in FIG. 1 this means, for example, that among a first acousto-optic 12' crystal and an adjacent second acousto-optic crystal 12", the electro-acoustic transducer 14 connected to the first acousto-optic crystal 12' is arranged between the first acousto-optic crystal 12' and the second acousto-optic crystal 12", and the acoustic isolator between the first acousto-optic crystal 12' and the second acousto-optic crystal 12" is arranged between the electro-acoustic transducer 14 and the second acousto-optic crystal 12".

In the case of a preferred embodiment of the acousto-optic deflector with a layered structure 10, all of the electro-acoustic transducers 14 connected to the acousto-optic crystals 12 preferably contain two electrodes 20a, 20b and a piezoelectric plate 22 arranged between them (see FIG. 1b), where among the two electrodes 20a, 20b, electrode 20a is connected to the crystal 12 in such a way that it is suitable for passing on the vibrations of the piezoelectric plate 22 and so for generating an acoustic wave in the crystal 12. For example the metal layer forming the electrode 20a may be applied to the appropriate surface of the crystal 12 using ablation (evaporation). At least one of the two electrodes 20a, 20b is connected to an electric signal generator 18 controlling the transducer 14. Preferably the transducers 14 may be controlled individually, independently of each other.

The piezoelectric plate 22 is a plate made from a special material (such as quartz, tourmaline) the surface of which when placed in an electric field deforms, it is stretched in the one direction and compressed in the other direction.

By periodically changing the voltage connected to the electrodes 20a, 20b via the electric signal generator, the piezoelectric plate 22 may be caused to periodically vibrate. The piezoelectric plate 22 transmits the periodical vibration through the electrode 20a to the acousto-optic crystal 12 connected to the electrode 20a, due to which effect acoustic waves 15 with a period equal to the period of the transmitted vibration are created in the acousto-optic crystal 12.

In the case of an exemplary embodiment of the acousto-optic deflector with a layered structure 10 according to the invention there are acoustic isolators positioned between the adjacent acousto-optic crystals 12, which may preferably be made from vaporised metal and air.

In the case of a preferred embodiment the acoustic isolator 16 contains an air gap and/or a vacuum space. The acoustic waves 15 generated with the electro-acoustic transducer 14 in the air gap filled with rarefied gas, such as air, or in the vacuum space are essentially unable to propagate, due to this the acoustic wave 15 propagated in the acousto-optic crystal 12 can be prevented from spreading into the adjacent acousto-optic crystal 12 separated by an acoustic isolator 16.

In the following the use of the acousto-optic deflector with a layered structure 10 according to the invention is presented with reference to the above exemplary elements, i.e. the procedure for deflecting an optical beam 50 using an acousto-optic deflector with a layered structure 10.

The acousto-optic deflector with a layered structure 10 contains at least two acousto-optic crystals 12, among which a first acoustic wave 15' is created in the first acousto-optic crystal 12' using the first electro-acoustic transducer 14' connected to the first acousto-optic crystal 12', and a second acoustic wave 15" is created in the second acousto-optic crystal 12" using the second electro-acoustic transducer 14" connected to the second acousto-optic crystal 12" and arranged between the first acousto-optic crystal 12' and the second acousto-optic crystal 12" in the way illustrated in FIGS. 2a and 2b.

The electro-acoustic transducers 14', 14" are controlled by the electrical signal generator 18 in such a way that preferably a periodical voltage signal, more preferably a chirp voltage signal is sent to the electrodes 20', 20" of the transducers 14', 14" using the electrical signal generator 18. Through the synchronised control of the electro-acoustic transducers 14', 14" connected to the individual acousto-optic crystals 12', 12", synchronised acoustic waves 15', 15" are created in the individual acousto-optic crystals 12', 12" in such a way that due to the effect of the voltage signals sent to the electrodes 20', 20" of the electro-acoustic transducers 14', 14", the piezoelectric plates 22', 22" of the electro-acoustic transducers 14', 14" start to vibrate, which vibration is passed on to the acousto-optic crystals 12', 12" connected to them.

FIG. 2a illustrates the control of the acousto-optic deflector with a layered structure according to the invention that focuses an optical beam 50 passing through it into one point.

In the case of this embodiment an acoustic wave 15 with the desired frequency profile that fills the entire aperture 11 of the acousto-optic deflector 10 is created in the acousto-optic deflector 10 so that an acoustic signal 15', 15" is generated in the individual acousto-optic crystals 12', 12" that has a frequency profile that complies with the part of the acoustic wave 15 falling on the given acousto-optic crystal 12', 12" using the electro-acoustic transducer 14', 14" belonging to the given the acousto-optic crystal 12', 12". In the context of the present invention, frequency profile means the spatial frequency distribution of the acoustic wave 15 along the direction of propagation of the acoustic wave 15.

In the case of the embodiment illustrated in FIG. 2a an acoustic wave 15 is created with a frequency profile of a chirp signal so that the spatial section of the chirp signal falling on the given acousto-optic crystal 12', 12" is created in the individual acousto-optic crystals 12', 12" using the electro-acoustic transducer 14', 14" belonging to the given acousto-optic crystal 12', 12".

A chirp signal is a signal the frequency of which increases or reduces over time. Depending on whether the change of the frequency of the chirp signal is linear or non-linear over time, the chirp signal is determined to be either linear or non-linear. Linear chirp signals are used in acousto-optic deflectors in order to create stationary focus spots. Patent document number WO2013/102771A1 deals with the use of non-linear chirp signals in acousto-optic deflectors.

An acoustic wave 15 with a frequency profile equal to that of a chirp signal passes through the acousto-optic crystal 12, as a result of which a continually changing refractive index is created in the acousto-optic crystal 12 in the direction of propagation of the acoustic wave 15. An initially parallel optical beam 50, at an angle to the direction of propagation of the acoustic wave 15, passing through an acousto-optic crystal 12 filled with an acoustic wave 15 with a frequency profile equal to that of a chirp signal on emerging will be either converging or diverging depending on whether the frequency of the chirp signal is increasing or decreasing over time. The transducers 14 and acoustic isolators 16 of the acousto-optic deflector 10 obscure the part of the optical beam 50 falling on them, however, the obscuring will only cause a slight reduction in maximum intensity in the PSF—Point Spread Function, which gives the brightness distribution of the optical beam 50 passing through the acousto-optic deflector 10. In other words the obscuring will not appear in the intensity distribution projected onto the focus plane of the optical beam 50 passing through the acousto-optic deflector 10. The focussing of the optical beam 50 outside of the acousto-optic deflector 10 takes place preferably with an optical element placed after the acousto-optic deflector 10, for example, with a lens or lens system (typically with an objective), as is obvious for a person skilled in the art. As the acoustic wave 15 propagates in the acousto-optic crystal 12, the focus point of the focussed optical beam 50 continually moves along a straight line. The movement of the focus point may be compensated for, for example, by placing several acousto-optic deflectors with a layered structure 10 one after the other where the directions of propagation of the acoustic waves 15 propagated in neighbouring acousto-optic deflectors with a layered structure 10 are opposite.

In the case of the embodiment of the acousto-optic deflector with a layered structure 10 according to the invention illustrated in FIG. 2a, by the synchronised controlling of the electro-acoustic transducers 14', 14" connected to the individual acousto-optic crystals 12', 12", the optical beam 50 passing through is focussed into one point with the individual acousto-optic crystals 12', 12" (in a given case with the involvement of a lens or lens system placed after the acousto-optic deflector 10). The thickness of the electro-acoustic transducers 14 arranged between the acousto-optic crystals 12 is preferably smaller than 100 µm in the interest of as little as possible of the optical beam 50 passing through being obscured, but naturally embodiments may also be imagined where the thickness of the electroacoustic transducers 14 arranged between the acousto-optic crystals 12 is greater than 100 µm. Accordingly, the thickness of the acoustic isolators 16 is also planned to be minimal.

The efficiency of an electro-acoustic transducer 14 is usually optimal in a frequency range specified by a maximum fmax frequency and a minimal fmin frequency, in other words it is in this range that it is most suitable for generating acoustic waves 15. The fmin and fmax frequencies may be given in such a way that the output produced by the transducer 14 at the fmin and fmax frequencies drops to a half of the power supplied to the transducer 14, i.e. the output of the transducer between the fmin and fmax frequencies is greater than 50%. Due to the fact that in the case of a chirp signal the frequency of the acoustic wave 15 created by the electroacoustic transducer 14 continuously changes, after a time the frequency of the acoustic wave 15 will necessarily reach one of the limits of the frequency range. In this case the excitement of the acoustic wave 15 will be interrupted and the excitement may be restarted at a frequency within the available frequency range, creating a new acoustic wave 15. With the interruption of the excitement of the acoustic wave 15, the focussing of the optical beam 50 passing through the acousto-optic crystal 12 is also interrupted. The optical beam 50 is focussed once again with the creation of a new acoustic wave 15, in other words by completely filling the acousto-optic crystal 12. Therefore the time passing between the disintegration of the focus point of the optical beam 50 and the entire optical beam 50 being once again completely focussed is determined by the amount of time needed for the new acoustic wave 15 to fill the acousto-optic crystal 12.

In the case of a preferred embodiment of the acousto-optic deflector with a layered structure 10 containing N acousto-optic crystals 12, where the acoustic isolators 16 separating the individual acousto-optic crystals 12 are positioned at the same distance d from each other, the acoustic wave 15 is built up over the entire aperture 11 of the acousto-optic deflector 10 in the time 1/N, as opposed to an acousto-optic deflector with the same aperture 11 containing a single (undivided) acousto-optic crystal 12. Therefore, in the case of an acousto-optic deflector 10 containing N acousto-optic crystals 12, the time passing between the disintegration of the focus point of the optical beam 50 and its refocusing drops to 1/N as compared to an acousto-optic deflector containing a single acousto-optic crystal 12 and an aperture of the same size.

In FIG. 3a the spatial distribution of the frequency of the acoustic wave 15 created in the acousto-optic crystals 12', 12" may be seen over the entire aperture 11 of the acousto-optic deflector with a layered structure 10 in the case of the embodiment according to FIG. 2a.

With respect to the acoustic wave 15 created in this way in the case of the present embodiment, it happens that the difference between the frequencies measured at any two points at the same distance from each other is constant, in other words a continual, linear function may be fitted onto the distance-frequency-function (which has a break at the location of the transducers 14 and acoustic isolators 16). Naturally, with another type of control a non-linear frequency function may be established (for example, for moving the focus point on a given trajectory).

The cross-sectional picture of another embodiment of the acousto-optic deflector with a layered structure 10 according to the invention may be seen in FIG. 2b, in this case the optical beam 50 is focussed at several points, and, if necessary, at different distances (depths) from the acousto-optic deflector with a layered structure 10. In a given case the focussing may be performed with the help of a lens or lens system placed after the acousto-optic deflector 10.

In the case of this embodiment an acoustic wave 15 is created with a frequency profile made up of several chirp signals focussing the optical wave passing through the aperture 11 of the acousto-optic deflector with a layered structure 10 to several points so that the given spatial section of the chirp signal falling on the given acousto-optic crystal 12', 12" in the individual acousto-optic crystals 12', 12" is created (see FIG. 3b) using the electro-acoustic transducer 14', 14" belonging to the given acousto-optic crystal 12', 12".

The chirp signals created in the various acousto-optic crystals 12', 12" of the acousto-optic deflector with a layered structure 10 focus the optical beam 50 passing through the acousto-optic deflector with a layered structure 10 at various positions, in other words with the synchronised control of the transducers 14', 14" connected to the individual acousto-optic crystals 12', 12" focussing the passing optical beam 50 into at least two points with the individual acousto-optic crystals 12', 12" (and the beam parts are focussed to a number of points equal to the number of beam parts).

In the case of a preferred embodiment the focussing of the optical beam 50 to several points may take place in such a way that each acousto-optic crystal 12 of the acousto-optic deflector with a layered structure 10 focuses the part of the optical beam 50 passing through it to a different point. Naturally, an embodiment may be imagined in that several (adjacent or not adjacent) acousto-optic crystals 12 of the acousto-optic deflector with a layered structure 10 focus a part of the optical beam 50 and the other acousto-optic crystals 12 of the acousto-optic deflector 10 focus to another point. It may also be imagined that the incoming optical beam 50 is split into more than two beams by the crystals 12 of the acousto-optic deflector 10 and is focussed at more than two points.

Various modifications to the above disclosed embodiments will be apparent to a person skilled in the art without departing from the scope of protection determined by the attached claims.

The invention claimed is:

1. Acousto-optic deflector with a layered structure (10) comprising at least two electro-acoustic transducers (14, 14', 14") and at least two adjacent acousto-optic crystals (12, 12', 12") to each of which at least one electro-acoustic transducer (14, 14', 14") is connected, and wherein the adjacent crystals (12, 12', 12") are separated by an acoustic isolator (16), characterised by that a first electro-acoustic transducer (14') is connected to a first acousto-optic crystal (12') and a second electro-acoustic transducer (14") is connected to a second acousto-optic crystal (12") such that the second electro-acoustic transducer (14") is arranged between the first acousto-optic crystal (12') and the second acousto-optic crystal (12"); and the at least two transducers (14, 14', 14") are controlled independently of each other.

2. The acousto-optic deflector according to claim 1, characterised by that the acoustic isolator (16) between the first and the second acousto-optic crystals (12', 12") is arranged between the second transducer (14") and the first acousto-optic crystal (12').

3. The acousto-optic deflector according to claim 1, characterised by that the at least two adjacent electro-acoustic transducers (14', 14") connected to the acousto-optic crystals (12', 12") comprise two electrodes (20) and a piezoelectric plate (22) arranged between them, and of the two electrodes one electrode (20a) is connected to the acousto-optic crystal (12).

4. The acousto-optic deflector according to claim 3, characterised by that at least one electrode (20a, 20b) of the two electrodes (20) is connected to an electric signal generator (18) controlling the transducer (14).

5. The acousto-optic deflector according to claim 1, characterised by that the thickness of the transducer (14") arranged between the acousto-optic crystals (12', 12") has a thickness of less than 100 μm.

6. The acousto-optic deflector according to claim 1, characterised by that the acoustic isolator (16) comprises a secondary electroacoustic transducer (14a) for generating a blanking signal.

7. The acousto-optic deflector according to claim 1, characterised by that the acoustic isolator (16) comprises an air gap and/or a vacuum space.

8. Method for deflecting an optical beam using an acousto-optic deflector (10) comprising at least a first and a second acousto-optic crystal (12, 12', 12") and at least a first electro-acoustic transducer (14') connected to the first acousto-optic crystal (12') and a second electro-acoustic transducer (14") connected to the second acousto-optic crystal (12") characterised by simultaneously creating a first acoustic wave (15') in the first acousto-optic crystal (12') using the first electro-acoustic transducer (14'), and a second acoustic wave (15") in the second acousto-optic crystal (12") using the second electro-acoustic transducer (14"), which is arranged between the first acousto-optic crystal (12') and the second crystal (12").

9. The method according to claim 8, characterised by creating said acoustic waves (15', 15") in individual acousto-optic crystals (12', 12") in a synchronised way by the synchronised control of the electro-acoustic transducers (14', 14") connected to the individual acousto-optic crystals (12', 12").

10. Method according to claim 9, characterised by creating an acoustic wave (15) having a frequency profile made up of several chirp signals focusing the optical beam (50) passing through an aperture (11) of the acousto-optic deflector (10) to several points by creating in individual acousto-optic crystals (12) a given spatial section of the chirp signal using the electro-acoustic transducer (14) belonging to the given acousto-optic crystal (12).

11. Method according to claim 8, characterised by focusing the optical beam (50) into one point with the acousto-optic crystals by the synchronised control of the electro-acoustic transducers (14', 14") connected to individual crystals (12', 12").

12. Method according to claim 8, characterised by focusing the optical beam (50) into at least two points with individual acousto-optic crystals (12', 12") by the synchronised control of the electro-acoustic transducers (14', 14") connected to the individual crystals (12', 12").

13. Method according to claim 8, characterised by creating in the acousto-optic deflector (10) an acoustic wave (15) with a desired frequency profile filling entire aperture (11) of the acousto-optic deflector (10) in such a way that a spatial section of the acoustic wave (15) falling on a given acousto-optic crystal (12) is created in individual acousto-optic crystals (12) using the electro-acoustic transducer (14) belonging to the given acousto-optic crystal (12).

14. Method according to claim 8, characterised by creating an acoustic wave (15) with a frequency profile corresponding to a chirp signal by creating a spatial section of the chirp signal falling on a given acousto-optic crystal (12) using the electro-acoustic transducer (14) belonging to the given acousto-optic crystal (12).

* * * * *